United States Patent
Shannon (10) Patent No.: US 6,356,660 B1
(45) Date of Patent: Mar. 12, 2002

(54) METHOD FOR COMPRESSING RASTER DATA

(75) Inventor: Terrence M. Shannon, Kuna, ID (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/397,420

(22) Filed: Sep. 17, 1999

Related U.S. Application Data (63) Continuation-in-part of application No. 08/953,848, filed on Oct. 15, 1997.

(51) Int. Cl.[7] ................................................. G06K 9/46
(52) U.S. Cl. .................... 382/232; 382/237; 382/244; 382/246; 358/426; 358/427
(58) Field of Search ............................... 382/232, 233, 382/237, 238, 244, 245, 246; 358/426, 261.1, 261.2, 261.3, 427

(56) References Cited

U.S. PATENT DOCUMENTS 5,521,641 A * 5/1996 Kinouchi et al. ........ 358/261.2
5,970,177 A * 10/1999 Chinnock ................... 382/244

* cited by examiner

Primary Examiner—Thomas D. Lee
(74) Attorney, Agent, or Firm—Anthony J Baca (57) ABSTRACT

Raster images are highly compressed by first reordering the data. Next the reordered data is indexed to encode any and all predicted runs and literal runs. Each piece of the present line of the raster image is compared to a previous line. If there is a match, then the present piece is a predicted run and indexed accordingly. If there is no match, then the present piece is a literal run and indexed accordingly. A predicted run can have a minimum run length of one piece, and a maximum run length of the image width in pieces divided by the number of strings. The same is true for literal runs. The index strings are then compressed using a lossless compression method such as Huffman encoding. If Huffman encoding is used, the Huffman tables are predefined and known to both the compressor and decompressor. As the compressor compressed the index strings, the Huffman tables are adapted. The decompressor is notified by the compressor when the adapted tables are to be used.

11 Claims, 8 Drawing Sheets

METHOD FOR COMPRESSING RASTER DATA

RELATED APPLICATIONS

The present invention is continuation in part of "Utilizing A Contrived Dither Matrix To Enhance The Compressibility Of Raster Images", Ser. No. 08/953,848, filed Oct. 15, 1997.

TECHNICAL FIELD

The present invention relates to data compression and more particularly to a method and apparatus for compressing raster data

BACKGROUND OF THE INVENTION

As monochrome laser printer technologies improve, printers can create pages with higher image resolution. The amount of raster data needed to be sent to a printer to print an image also increases, adversely affecting printer performance. When an image is scaled and dithered before it is sent to a printer, an 8 by 10 inch raster image requires 0.9 Mbytes of data for a 300 DPI device, 3.6 Mbytes for a 600 DPI device, and 14.4 Mbytes of data for a 1200 DPI device.

Some printers and drivers, such as monochrome Hewlett-Packard LaserJets® printers, are capable of accepting either color raster data or dithered monochrome raster data to print an image. If color data is sent, the printer performs scaling and dithering and produces the same image that would have been produced if the driver scaled and dithered. The choice to send color data verses dithered monochrome data is based on reducing the amount of I/O needed to print the image. Color images have more data per pixel, but scaled and dithered monochrome images are usually higher resolution, in this case 600 or 1200 DPI. If a source color image is of low resolution, or is significantly scaled up, then there is an I/O advantage to send a color or grayscale version of the source image and let the printer perform scaling and dithering. In practice, the source color image is usually converted to an 8 bit per pixel grayscale image by the driver. If the source color image is of high resolution or if it is not significantly scaled, then there will be less I/O if the printer driver performs dithering and scaling, and sends the printer a monochrome image that is ready to print. Some laser printers do not have the capability to accept color or grayscale data, so scaling and dithering is always performed on the host by the driver.

There are several compression options available to compress source images or dithered monochrome images. Most are variants of tagged image file format (TIFF revision 4) and delta row compression. The available versions of delta row compression are not effective for dithered monochrome images because each row is made different from the previous row by virtue of the dither matrix. The run length encoded TIFF compression methods are the best alternative currently available, and they work best when the dithered image is significantly scaled up or when the resulting image has a lot of area that is of the same color, such as business graphics and charts.

Scaling an image affects the compressibility of an image because one source pixel produces many similar output pixels, and the compressibility using a TIFF scheme relies on the similarity of adjacent pixels. It should also be noted that scaling is not done just to change the physical dimensions of an image, scaling is also used to convert image resolution. For example, if a source image has a resolution of 72 pixels per inch and has a dimension of 5 inches by 5 inches, it will contain 129,600 pixels. When the image is scaled and dithered for a 1200 DPI monochrome printer, and printed as a 5 inch by 5 inch image, it will be scaled to 36,000,000 pixels.

The most problematic raster images printed on monochrome laser printers are high resolution images similar to scanned photographs. What makes these images difficult to compress is the high frequency components. Experimentation has shown that low to moderate resolution scanned photos, business graphics, line art, and small high resolution images do not pose much of a performance challenge to LaserJet® printers, Large, high resolution images that resemble photographs offer a considerable challenge due to the amount of I/O sent to the printer. Sources of high resolution raster images are becoming more prevalent with the increased use of the internet, availability of inexpensive scanners, digital cameras, video capture computer accessories, and photo scanning services. This present invention addresses the performance challenge posed by high resolution photographic like raster images.

Microsoft Windows® (Windows is a registered trademark of Microsoft Corporation) defines a set of raster operations (ROPs) that are used to combine raster images. Hewlett-Packard LaserJet® printers are capable of performing ROPs even if the image is transformed to monochrome data by scaling and dithering on the host computer prior to being sent to the printer. To be ROP compatible, all transformation operations from a source DIB to a destination monochrome bitmap must be deterministic on a pixel by pixel basis so that exact results are obtained any time a source pixel is transformed. Consider an example where an application program uses an XOR (exclusive or) ROP to create a white window in the center of a raster image. First, the application program sends the entire color image to the driver where the color data is scaled and dithered into monochrome data. This dithered image is sent to the printer and no record of it or the source color image remains available to the driver. Next, the application selects a subset of the same image and sends it to the printer. The driver dithers and scales this subset image. For the XOR ROP to be successful, each pixel of dithered data from the image subset must exactly match the pixels of the original image within the bounds of the image subset, so each source image pixel must undergo the exact same scaling and dithering to produce a dithered raster segment where each destination dot of the image subset exactly overlays the destination dots of the original image. "Neighborhood" operations where the value of a destination pixel may depend on the value of a neighboring pixel will not be ROP compatible if the neighboring pixels are not available to be used in the subsequent ROP.

Examples of other transformations that use neighborhood operations are error diffusion dithering, blue noise dithering, and bi-linear scaling. Lossy compression techniques must also be excluded if we wish to retain ROP compatibility. Although ROPs are defined for raster data, they are seldom used by application programs. In the above example, the white rectangle could have been accomplished by sending a rectangle of white raster with an opaque drawing mode.

Historically, ROPs have provided Windows with fast, easy ways to manipulate raster graphics on a display screen. The Windows® GUI is successful, in part, because it provides a means to write to any device using the same set of graphical commands (GDI). Every Windows® compatible raster device supports ROPs either directly or by letting GDI provide the support. Regardless of the frequency of use, since ROPs are defined and available for application programs to use, a functionally complete printer driver must support ROPs.

Another example that illustrates the need to avoid neighborhood operations and remain deterministic is the fact that some application programs send image data in segments. An image may be split horizontally or vertically into segments as small as one pixel. One reason that application programs may fragment raster images is because Windows® does not yet support arbitrary raster rotation, so applications rotate images prior to sending them to the driver. Some applications process the rotation in segments, and send each segment to the driver as it is completed, letting the printing process assemble the final image from the segments. Single pixel calls are sometimes found at the tip and the base of a rotated image. These image segments may be scaled and dithered by the printer driver before being sent to the printer, and each image segment must seamlessly join adjacent segments to make the final printed image. Neighborhood operations may cause undesirable artifacts to appear at the borders of the image segments.

This present invention uses clustered dot ordered dithering to be deterministic and supports ROPs as well as seamless image construction. See, Ulichney, R., *Digital Halftoning*. MIT Press, Cambridge, Mass., 1987. This determinism refers to the fact that a given source pixel will create a specific group of destination pixels as a function of scaling and dithering, and those destination pixel values are solely determined by the value of the single source pixel.

SUMMARY OF THE INVENTION

In order to accomplish the present invention there is provided a method for compressing raster images. The method is implemented by collating sub pieces of the image in to at least one sub-string. Each sub-string is indexed to encode any predicted runs and literal runs. The resulting index sub-strings are compressed using a lossless compression method.

The step of collating may also determine, for each line of the raster image, if the raster image represents text or a halftoned image. If the raster image represent text then the sub pieces are sequential placed into one sub-string Alternatively, if the raster image represents the halftoned image, then the sub-pieces are interleaved into multiple sub-strings.

There is also provided a method of decompressing compressed data into a raster image. The compressed data is decompressed using a lossless decompression method, into a plurality of index sub-strings. The plurality of index sub-strings are decoded by using an index table to convert predicted runs and literal runs into data in a sub-string. The sub-strings are interleaved to recreate the raster data.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention produces improved compression ratios for compression of raster images. The preferred embodiment of the present invention is useful for dithering and compressing high resolution images that resemble photographs or images of text. High resolution implies that the source image does not undergo much scaling when they are converted to dithered monochrome images. This present invention is intended to address a performance problem that monochrome printers may experience when high resolution images are encountered. The present invention generally achieves higher compression ratios for all images. While the present invention was developed for a 1200 DPI printer, the techniques discussed herein are directly apply to other monochrome devices. The technique discussed in this present invention can be applied to any monochrome printer, even those using liquid or solid inks.

There are several terms used in this present invention that may not be familiar to all readers. A DIB is a device independent bitmap that is a raster file format in common use in the Microsoft Windows® operating system. DPI means dots per inch and is used in this present invention to describe the resolution of raster files and printers. It is somewhat of a misnomer to apply DPI to a DIB, but the following description describes source images as if they have a resolution. This was done because by the time a DIB call reaches a printer driver, the GDI (graphics display interface) in concert with the application program, has determined a resolution for the DIB in the context of a call to a device of a specific resolution (such as a 600 DPI printer). A ROP is a raster operation as described by Windows® documentation. The term RLE as used means run length encoding of a compressed file, a known method used to compress data that tends to have repeating patterns.

In a laser printer, the laser is controlled with an accuracy that is relatively high with respect to the rest of the printing process. The light of the laser causes a static electrical charge to bleed through the print drum in the laser target area. This charge is used to attract opposite charged toner to the drum in the same location that the laser light struck the drum. Charged paper then attracts the toner from the drum to the paper and the toner is fused to the paper by heat and pressure. This is not a precision process. In the final output, each dot is actually an asymmetrical blob on the paper.

The size of this blob is important for controlling the quality of printed text on the page. Because text is black, viewers desire the blackest, crispest text available. This is accomplished by using the smallest blob size practical while still obtaining complete toner coverage for black text and graphics. A logical pixel for a 600 DPI printer would be a square where each edge would have a length of 1/600 of an inch. An ideal dot of toner would be a circle that completely covers the square and intersects the square at each corner. This circle of toner would have four chords that overlap into neighboring squares to the top, right, bottom, and left of the filled square. If the area of the square is normalized to an area of 1 square unit, then the circle would have a diameter equal to the diagonal of the square, for an area of 1.57 square units. Each of the chords that overlap neighboring squares would have area 0.143 square units.

Figure 1:
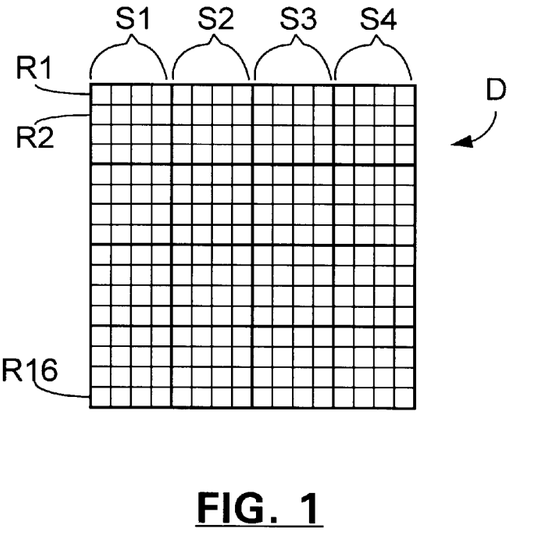
FIG. 1 shows a conventional 16×16 matrix.

The present invention is not limited to a specific embodiment illustrated herein. Referring particularly to FIG. 1. The dither matrix (D) is a conventional 16×16 pixel dither matrix as understood in the art. Typically, this is a classical dithering method that is rooted in work pioneered by B. E. Bayer. Bayer, B. E., "An optimum method for two-level rendition of continuous-tone pictures" in *Proceedings of IEEE International Conference in Communications*, pp. 26.11–26.15, 1973. For additional information about digital halftoning see, "Digital Halftoning", Ulichney, R, ISBN 0-262-21009-6 (fourth printing 1993), incorporated herein by reference.

Each section of the 16×16 matrix (D) is a 1×4 nibble. Each column of the 4×1 section are labeled S1, S2, S3 and S4 as illustrated in FIG. 1. The number of sub nibbles is determined by the width of the dither matrix in pixels divided by the number of pixels in a nibble. In the preferred embodiment, the dither width is 16 and the nibble size is 4 bits, thus there are four strings.

Consider how dots fill in the matrix. When the gray level is zero (white), no dots in the matrix are on. As the gray level gradually increases, black dots will be placed in the matrix to make the apparent gray level of the entire 16×16 matrix (D) seem darker.

Figure 3:
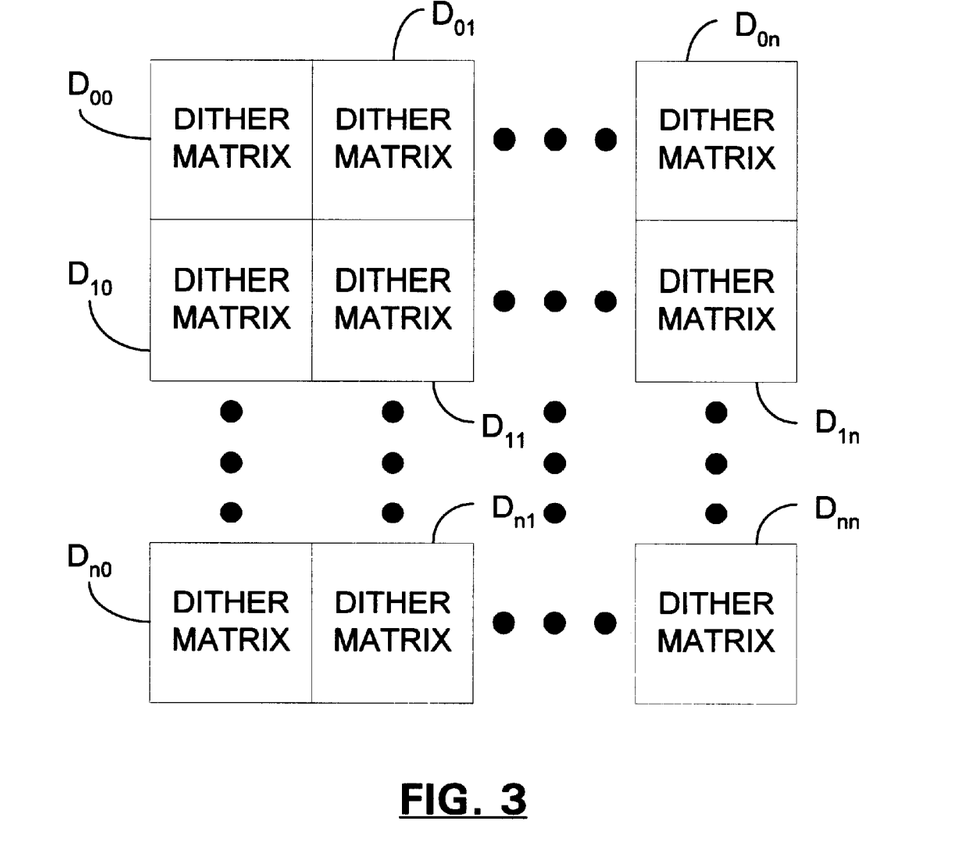
FIG. 3 shows how a dither matrix is tiled across an image.

Because the dither matrix D is tiled across the image, as shown in FIG. 3, a single pixel in $D_{00}$ is likely to have the same value as the same pixel location in $D_{01}$. Similarly, a single pixel in $D_{00}$ is likely to have the same value as the same pixel location in $D_{10}$. Using this strong correlation, the resultant sub-pieces of the dithering process are organized by sub-pieces for each row. In the preferred embodiment, sub-pieces are nibbles, however, sub-pieces could be as small as a single bit, or pixel, or any other size.

Figure 2:
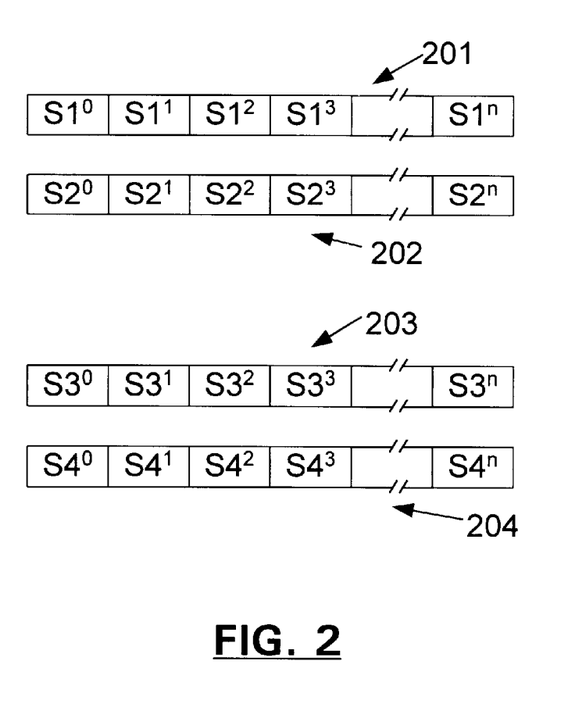
FIG. 2 shows the nibbles as placed in sub-strings.
Figure 6:
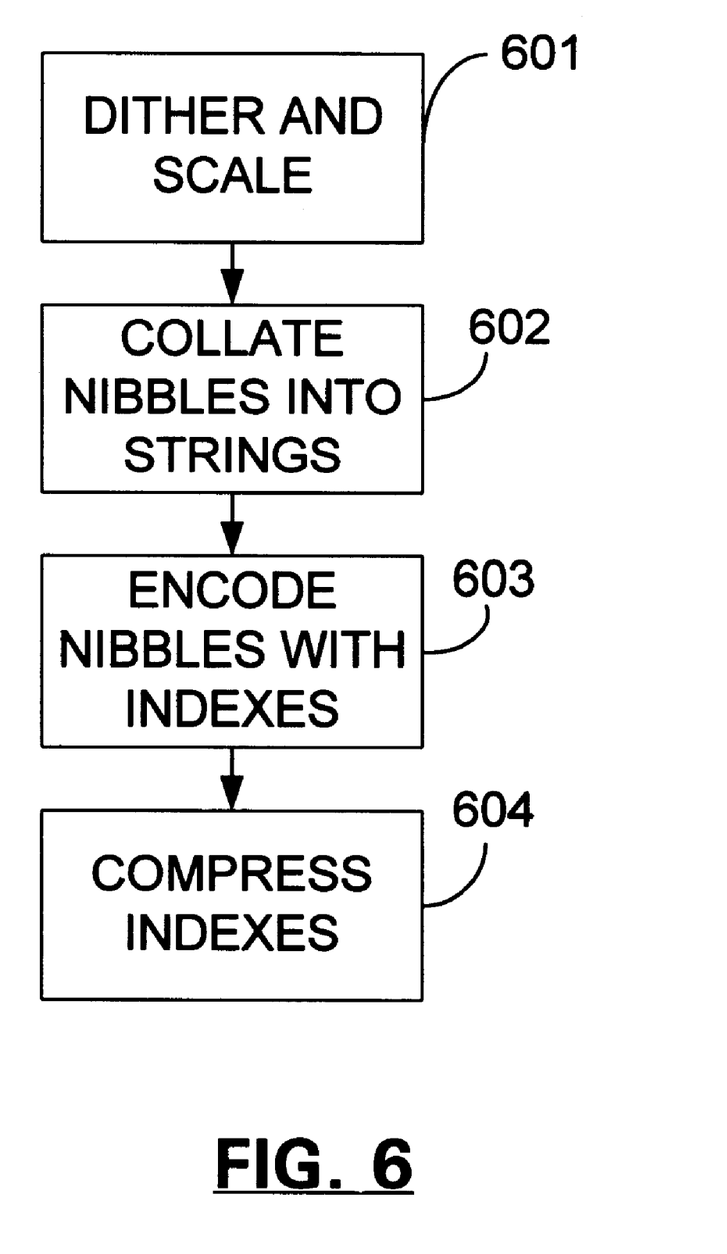
FIG. 6 is a simplified flow chart showing the high level flow in accordance with the present invention.

Referring to FIGS. 2 and 6 the re-ordering will be described in greater detail. First, the image is dithered and scaled as known in the art using the dither matrix D (601). Next, row by row, the image is divided into nibbles and collated into strings as shown in FIG. 2 such that for the row, all S1 nibbles are in one substring (201), all S2 nibbles are in a second substring (202), all S3 nibbles are in a third substring (203) and all S4 nibbles are in a fourth substring (204).

Now that a row has been re-ordered, each nibble is encoded (603) by an index as described below. As a result of the replacement, the substring of FIG. 2 are transformed into the index substring as shown in FIG. 4.

Finally, each index substring (FIG. 4) is compressed (604) using a compression scheme as will be described in greater detail later.

Figure 4:
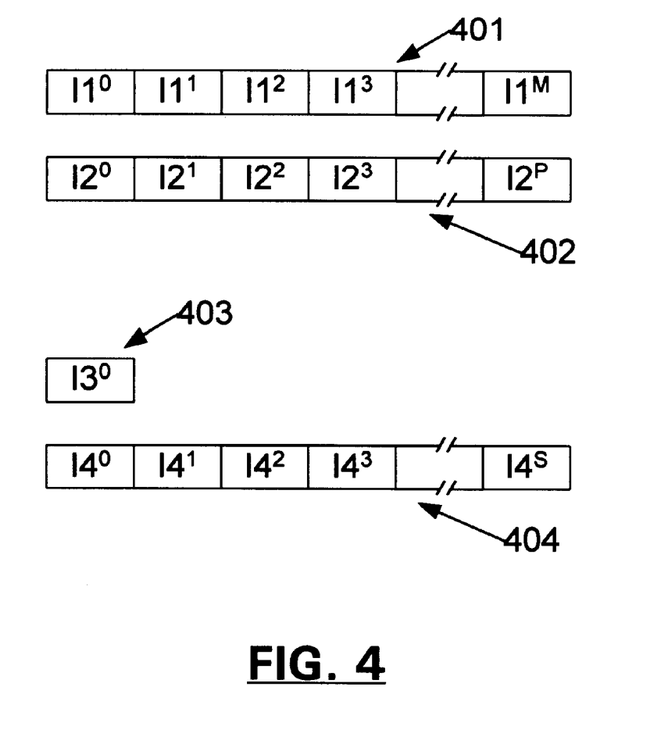
FIG. 4 shows how the index are place in sub-strings.

As mentioned above, each substring in FIG. 2 is transformed into the index substring of FIG. 4. Upon close examination of the correlating indexes, one notices that the substring of FIG. 2 each have n entries, the index substrings have an unrelated number of entries. Each index represents either a predicted run or a literal run of nibbles. Referring to FIG. 2, if a nibble in the current row matches the nibble in a previous row then that nibble is a predicted nibble candidate. If the nibble is not a predicted nibble, then it is a literal nibble. Note, a nibble that is a predicted nibble may be treated as a literal nibble to facilitate compression.

Figure 5:
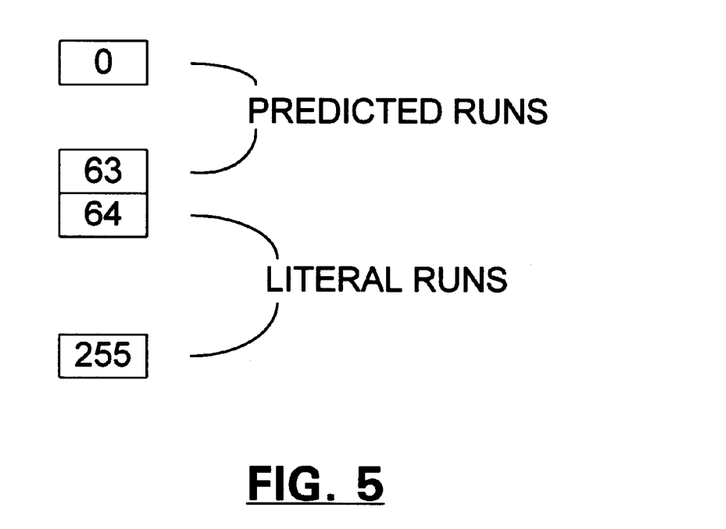
FIG. 5 show how the index table is split.

A predicted run can have a minimum run length of one nibble, and a maximum run length of the image width in nibbles divided by the number of strings. The same is true for literal runs. There are 16 different types of literal runs because a 4 bit nibble can have 16 combinations of bits. In the preferred embodiment, the indexes are 8-bit numbers, thus capable of representing 256 possible indexes. These 256 indexes are divided as shown in FIG. 5 indexes from 0–63 represent predicted runs of various lengths and indexes 64–255 represent literal runs of various lengths.

Specifically, in the preferred embodiment, array entry 0 (index 0) represents a predicted run of length 1 nibble. Index 1 is a predicted run of length 2 nibbles, this continues until index 60. Index 60 represents a predicted run of length (images width)/(numbers of strings * 8). Index 62 represents a predicted run of length (image widths)/(number of strings * 4). Index 63 represents a predicted run of length (image width)/(number of strings). This enables all predicted runs of length 60 or less to be directly represented in the array. If the image has very long predicted runs, such as may occur in white space, black space, or levels of constant gray across an entire image, entries 60 through 63 are available for use. If a predicted run is too small to fit in array entry 60 but too large to fit in array 59, then it will be broken into multiple segments of 60 nibbles in length or less to be placed into entry 59 or lower.

A similar scheme is used for literal run entries. Array entries 64 through 255 are reserved for literal runs. As before, there are 16 different kinds of literal runs and they are 192 entries in the array from index 64 through 255. This allocates 12 arrays entries for each type of literal run. Array entries 64 through 79 contain all 16 types of literal runs that have run length of one nibble. Array entries 80 through 95 contain all 16 types of literal runs that have length of two nibbles. This pattern continues until all 12 groups of different run lengths fill the 256 array. This pattern is used because of the simplicity of the compressor and decompressor to locate the proper index for a given run length and nibble pattern. The run length of the nibble groups can be found by calculating ((index/16)−3) using integer arithmetic. The nibble bit pattern is (index % 16). To facilitate long literal runs, the run length of the 12 groups is allocated as follows:

| | |
|---|---|
| Group 1 | Length 1 |
| Group 2 | Length 2 |
| Group 3 | Length 3 |
| Group 4 | Length 4 |
| Group 5 | Length 5 |
| Group 6 | Length 6 |
| Group 7 | Length 7 |
| Group 8 | Length 8 |
| Group 9 | Length 9 |
| Group 10 | Length 10 |
| Group 11 | Length 20 (or Image Width/# of Strings *2) |
| Group 12 | Length 100 (or Image Width/# of Strings) |

In the preferred embodiment, a determination is made about whether the line is from a dithered raster image that contained gray values or a raster image that consist of black lines against a white background, such as a raster representation of a page of text. When indexing a dithered image, predicted runs are referenced back eight lines, while in "text" mode, predicted runs look back only one line. Additionally, when operating in "text" mode, the interleaved string S1–S4 are not created; only a single string (S1) is created.

Predicted row run data utilizes the similarity of the current row of dithered image data to a row 8 lines earlier. This similarity originates from the nature of images, scaling images up, and the pattern imposed by the dither matrix, thus, a different dither matrix size may use a different look-back for predicted rows. The compressor buffers 8 lines of output data for this comparison. The compressor examines the row of data 8 lines back and if the data exactly matches the current data, then that data is eligible to be a predicted row run. Predicted row data is not sent to the printer. The predicted row indexes instructs the decompressor to copy a specified number of nibbles from the line it decompressed 8 lines earlier and use that data in the current line. All the areas where the predicted row does not match the current line data will be compressed using literal nibbles.

An example of the indexing process may help the reader's understanding. Working with a dithered raster image and assuming that the data has already been collated into strings of nibbles. The following string (in hexadecimal numbers) is assumed to be the first string in the image:

String y=AAA000AAA0000BB00777

Because this is assumed to be the first line in the image, there can be no predicted runs, only literal runs. Alternatively, even with the first string, some default pattern, such as all zeros, can be used to compare against. For purposes of discussion, it is assumed that the first row is limited to literal runs only.

A portion of the table described above is expanded below, showing the index for literal runs of length four or less, for each 4-bit nibble.

|   | 1  | 2  | 3   | 4   |
|---|----|----|-----|-----|
| 0 | 64 | 80 | 96  | 112 |
| 1 | 65 | 81 | 97  | 113 |
| 2 | 66 | 82 | 98  | 114 |
| 3 | 67 | 83 | 99  | 115 |
| 4 | 68 | 84 | 100 | 116 |
| 5 | 69 | 85 | 101 | 117 |
| 6 | 70 | 86 | 102 | 118 |
| 7 | 71 | 87 | 103 | 119 |
| 8 | 72 | 88 | 104 | 120 |
| 9 | 73 | 89 | 105 | 121 |
| A | 74 | 90 | 106 | 122 |
| B | 75 | 91 | 107 | 123 |
| C | 76 | 92 | 108 | 124 |
| D | 77 | 93 | 109 | 125 |
| E | 78 | 94 | 110 | 126 |
| F | 79 | 95 | 111 | 127 |

String y starts with a run of three "A" nibbles. Referring to the table, a literal run of three "A" nibbles is indexed with the number 106 (6A hex). Next, there is a run of three "0" nibbles, which is indexed by 96 (60 hex). There next follows three "A" nibbles, which are indexed with 106 (6A hex) again. The four nibbles of "0" are indexed with 112 (70 hex). Index 91 (5B hex) replaces the literal run of the two "B" nibbles. The literal run of two "0" nibbles is indexed by 80 (50 hex) and the final literal run of three "7" nibbles is indexed by 103 (67 hex). The final Index y string for nibble String y is:

Index y=106, 96, 106, 112, 91, 80, 103 or

Index y=6A, 60, 6A, 70, 5B, 50, 67 (in hex)

The original 20 bits of String y has been replaced by the 14 bits of Index y. As the processes continues, eventually a string is reached wherein predicted runs can be used. Assume String x can be encoded using both literals and predicted runs from String y.

String x=AAA000AAA000BB00B777

Comparing String x to String y shows that the first 12 nibbles (AAA000AAA000) match. Therefore, the first 12 nibbles of String x are replaced with the index 12 (0C hex), which indicates that there is a predicted run of 12 nibbles. Next, there is a "B" nibble in String x verses a "0" in String y, thus there is no predicted run. The "B" nibble could be indexed as a single literal, however, the next nibble is also a "B", therefore there is a literal run of two "B" nibbles, which can be indexed by 91 (5B hex). Next, there is a possible literal run of two "0" nibbles. Comparing this to String y shows that there is no predicted run, therefore it is represented by index 80 (50 hex). String x next contains a single nibble of "B", which is indexed with 75 (4B). String x ends with three "7" nibbles. The run is both a predicted run and a literal run. It is a predicted run because String y has the identical nibbles. It is a literal run because it is a run of the same nibble. In this scenario, the preferred embodiment indexes this as a literal run 103 (67 hex). If each string had one more identical nibble that was not "7", then a predicted run would be more efficient. The final index String x for nibble String x is:

Index x=12, 91, 80, 75, 64 or

Index x=0C, 5B, 50, 4B, 67 (in hex)

The original 20 bits of String x has been indexed with 10 bits in Index x.

Referring back to FIG. 6. After the nibbles have been indexed as described above, the indexes are compressed using a losses compression algorithm (604). Several general purpose, lossesless data compression procedures are known in the prior art. For example, the Huffman method, the Shannon-Fano method, the Tunstall method, the Lempel-Ziv method and the arithmetic encoding method. The Huffman method is widely known and used, reference thereto in article of D. A. Huffman entitled "A Method For Construction Of Minimum Redundancy Codes", Proceedings IRE, 40, 10 pages 1098–1100 (September 1952) incorporated herein by reference. Reference to the Tunstall algorithm may be found in Doctoral thesis of B. P. Tunstall entitled "Synthesis of Noiseless Compression Codes", Georgia Institute of Technology (September 1967) incorporated herein by reference. Reference may be had to the Lempel-Ziv procedure in a paper authored by J. Ziv and A. Lempel entitled "A Universal Algorithm For Sequential Data Compression", IEEE Transactions on Information Theory, IT-23, 3, pages 337–343 (May, 1977) incorporated herein by reference. Additional information on arithmetic coding can be found in "An Introduction To Arithmetic Encoding"; by G. G. Langdon, Jr., IBM Journal of Research and Development, Vol. 28, n. 2, March 1984, 135–149; and "Arithmetic Compression Code Control Parameters Approximation"; by D. R. Helman, G. G. Langdon, Jr., and J. J. Rissanen, Vol. 23, n. 11, April 1981, 5112–5114 and U.S. Pat. No. 4,905, 297, "Arithmetic Coding Encoder And Decoder System", Langdon, Jr. et al. all incorporated herein by reference.

One of the first general purpose data compression procedures developed is the Huffman method. Briefly described, the Huffman procedure maps full length segments of symbols into variable length words. The Huffman procedure operates under the assumption that the probability with which each fixed length input segment occurs is known. This requirement of the Huffman procedure can in practice, be satisfied by the use of an adaptive version of the procedure which accumulates the necessary statistics during processing of the data. The preferred embodiment uses the Huffman method to compress the indexes.

The 256 indexing array described above is also used for the Huffman encoding of the compressed data stream. Consider that there is an array that represents predicted runs of various lengths, and literal runs of various lengths. Each one of these entries has a probable frequency of occurrence for a given raster image. The preferred embodiment was developed to optimize two types of raster images, a complex raster such as a high resolution scanned photograph and black text without gray values. The compressor was used to process a suite of images that could be considered typical for each of these two groups. From this a set of default probabilities for each element in the 256 array is encoded. The resultant Huffman bit pattern for each entry is stored in a 256 array.

When a raster image is processed, the compressor produces a sequence of array index values that represent the image. The compressor uses these array index values to look up the Huffman bit pattern stored in the 256 array and attach the Huffman bit pattern to the compressed data stream. The decompressor reads the Huffman compressed data stream, decodes the Huffman data into 256 array indices, and processes the array indices into a lossless representation of the raster image.

The compressor and decompressor each have two identical sets of default Huffman bit patterns used to start processing a raster image. One set of Huffman bit patterns is used for dithered raster images that primarily contain gray values, and the other set is used for raster images that consist of black lines against a white background, such as a raster representation of a page of text. The compressor and decompressor each have an algorithm that decides to use the set of text Huffman values, or the set of raster Huffman values for each line of raster that is processed. If a line is indeterminate, such as a line that is blank, the prototype will use the raster set of Huffman values.

When compressing in text mode, the predicted runs look back only 1 line, not 8 lines to compare current data with prior data. Text mode does not create interleaving strings S1 through S4, it just creates a single string of compressed data.

Text mode maintains two sets of Huffman data for literal runs. The idea is that literal runs are composed of nibbles, and most text have line widths of greater than 4 pixels at 600 and 1200 DPI. Literal runs also tend to occur when a text edge is encountered in a scanline, or during white space below text. Combining these factors yields a conclusion that if a literal nibble ends with a black pixel, the next literal nibble is favored to start with a black pixel. If a literal nibble ends with a white pixel, the next literal nibble is favored to start with a white nibble. I will get a better Huffman compression of the sets of literal nibbles if I maintain two sets of Huffman values for literal nibbles. I call these two sets the 1 Huffman table and the 0 Huffman table. If a literal nibble ends in a 1, the Compressor and the Decompressor will use encode and decode the next compressed element using the 1 table. If a literal nibble ends in a 0, the Compressor and Decompressor will encode and decode the next compressed element using the 0 table. If the next compressed element is a predicted run, the current Huffman table is used for encoding and decoding, and the table is not changed for the next compressed element. The Huffman tables 1 and 0 may start with identical frequencies for predicted runs, but since the literal run frequencies differ, all of the Huffman values used for encoding and decoding may differ for both predicted runs and literal runs after the tables are rebalanced.

Figure 7:
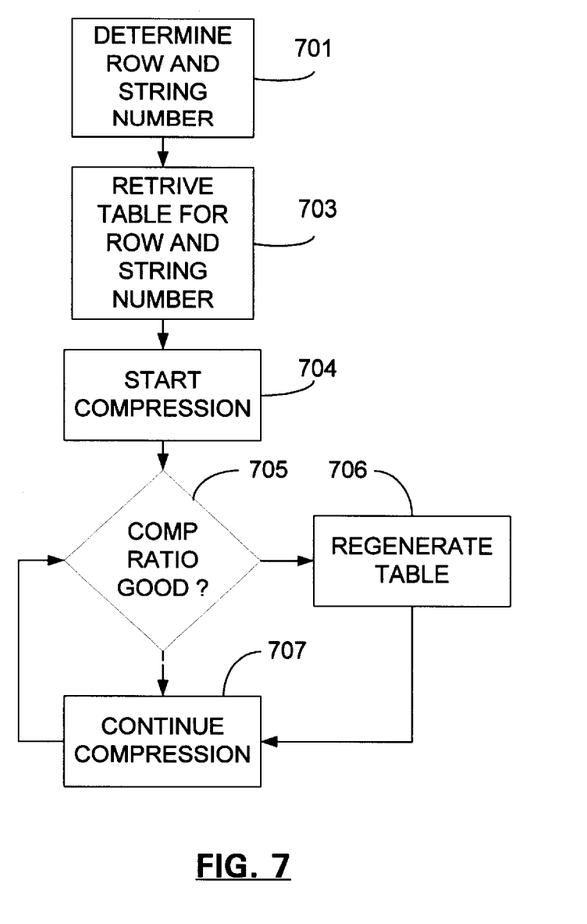
FIG. 7 is a simplified flow chart showing the high level flow of the lossless compression process.

Dithered mode maintains 64 sets of Huffman data each of 256 in size. This allows for each row in the dither matrix to have a separate set of Huffman tables; there are four Huffman tables associated with each row, one for each sub-string. FIG. 7 shows a high level view of the compression process. Before a string can be compressed the proper Huffman table of indexes must be determined. Assuming it is from a dithered image, the present row of the dither matrix and sub-string number must be determine (701) so that the proper Huffman table can be retrieved (703). Now that the compressor has the data and the correct table the compressor processes the first segment of an image using the predetermined default Huffman bit patterns stored in the 256 array. While this image segment is being processed, a count of each use of the array indices is kept in the 256 array. At some point, it becomes beneficial to calculate a new set of Huffman values (705) that are based on the image content. The compressor decides when the re-calculation should occur (706) and signals the decompressor to re-calculate based by using a signal bit that occurs at the first of each image line. This scheme enables the Huffman encoding to be influenced by image content without having to send any Huffman model data from the compressor to the decompressor. The new Huffman bit patterns are re-calculated (706) using a weighted combination of recent image data and the default or historical image data.

The compressor monitors how well the current image data fits the current Huffman values for the indices (705). The compressor is most efficient if the values if the Huffman values for the indices were optimal, but that would require pre-processing the image and sending Huffman model data to the decompressor. This requires additional processing and sending additional data. Depending on the system in use, it is possible that the entire system works faster by not processing the image twice (once to determine optimal Huffman encoding, and the second time to actually compress the data) but rather by compressing the image using default data that is stored in both the compressor and decompressor, and adjusting the Huffman encoding on the fly. If the compressor determines that the Huffman values are no longer a good fit for the image, it causes the Huffman values to be re-calculated in the compressor and the decompressor. These new Huffman values, based in part on recent image data, are used to compress the next segment of the image until the compressor again decides it is prudent to re-calculate. This works well in part because the compressor runs on a host computer which usually has more computational resources than the decompressor running on a printer, and the compressor has the entire task of deciding when to recalculate the Huffman values for the 256 array indices.

As the data is compressed, it must be placed into a data structure to facilitate storage or transmission. One possible structure is described below. The data starts with an origin of where to place the image on the page. This has an X and a Y value, each 32 bits long. The next values are the X and Y extents of the image. These two 32 bit numbers define the width and the height of the image in pixels.

The data then contains compressed data for each scanline. There are (Y extent) number of scanlines. Each scanline starts with an 8 bit sync byte, followed by Huffman compressed values that decode into array indices. The array indices are used by the decompressor to make the resulting image scanline. The scanline data is delimited by completing the scanline. The compressed data is in nibble format, so the compressed data may specify up to three extra pixels per line. The extra pixels should be ignored.

Use of the Lempel-Ziv method would not require the use of probability tables as described above. This simplification must be weighed against the likelihood that the compression ratios with the Lempel-Ziv method will be less than with the described Huffman method. Use of the arithmetic coding method could use separate text and dither context models to increase compression ratios.

Selection of a compression method depends on the system dynamics between the compressor and decompressor and the bandwidth of the transmission media. As known by those skilled in the art, some compression methods require different computational efforts and complexity between the compressor and the decompressor. In the preferred embodiment, the compressor is executed on a host computer. Such a system generally has large memory resources and significant amounts of computational power. Additionally, the host computer is not generally running in a real-time critical mode. The printer, however, generally has less memory resources and operates in a real-time environment. Thus, computational intensity can be shifted to the host computer to allow for a simpler, faster, and memory efficient decompressor to reside in the real-time environment. One skilled in the art will understand that other systems may require different tradeoffs.

When the data fills the image scanline, the next compressed element is the sync byte for the next line. When the number of scanline have been processed to match the Y extent defined at the beginning of the image, then the entire image is complete and no more image data is available.

Figure 8:
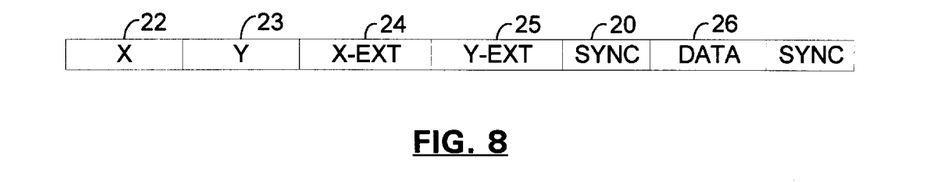
FIG. 8 is a graphical representation of the data structure with details about the sync byte.
Figure 9:
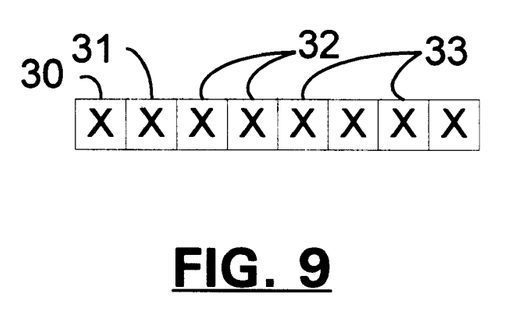
FIG. 9 shows the sync byte in more detail.

The beginning of each line of compressed data starts with Sync Byte 20 as shown in FIG. 8. The dither matrix has a page oriented anchor point. The purpose of Sync Byte 20 is to specify how the dithered image is synchronized to the dither matrix. The sync byte also signals the decompressor to rebalance the Huffman codes in the 256 array. There are 8 bits in the sync byte. The first, leftmost, high order bit is used to signal a rebalance action for the Huffman values. The next bit signals to the decompressor that the line being decompressed is a raster or text image. The next two bits indicate how many bits are needed to synchronize the image, and the values are 0, 1, 2, or 3 bits. This dithering displacement means that the image has started at the current active position, but the image will not encounter the beginning edge of a dither table entry for 0 to 3 pixels. The next three bits are the uncompressed image data needed to synchronize the image, so 0, 1,2, or all 3 of these bits are placed at the beginning of the uncompressed line and the rest of the line is synchronized to using the compressed nibbles. The last bit is presently unused.

Figure 10:
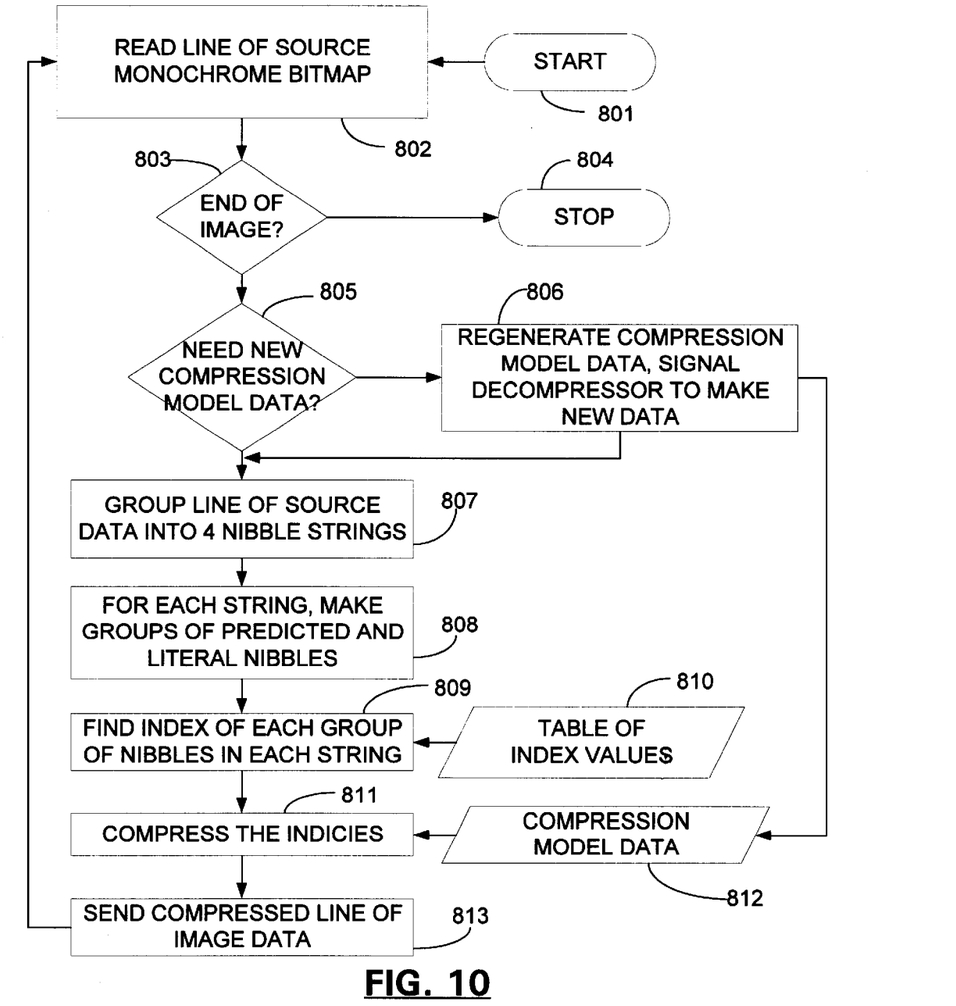
FIG. 10 is a flow diagram showing the complete compression process.

FIG. 10 shows the complete flow chart of the preferred embodiment. A line of the original monochrome bitmap is read (802). If there are no more lines to compress (803), the process is stopped (804). It is determined if the compression model data need to be generated (805) and if so, by then the data is generated (806). Such a determination could be accomplished several ways. For example, the compression ratio can be monitored and if it should exceed a predefined threshold, then the data is regenerated; alternatively, the data can be regenerated at regular intervals, based on the amount of data either input or output. Next, assuming that data is from a dithered image, the source data is grouped into the four nibble strings (807). Each nibble string is encoded with the index indicating the predicted and literal runs (808 and 809). Encoding uses the table of index values (810). The indexes are compressed (811) using the then present compression model data (812) for the present row being compressed. The compressed data is then sent, or stored, depending on the system needs.

Figure 11:
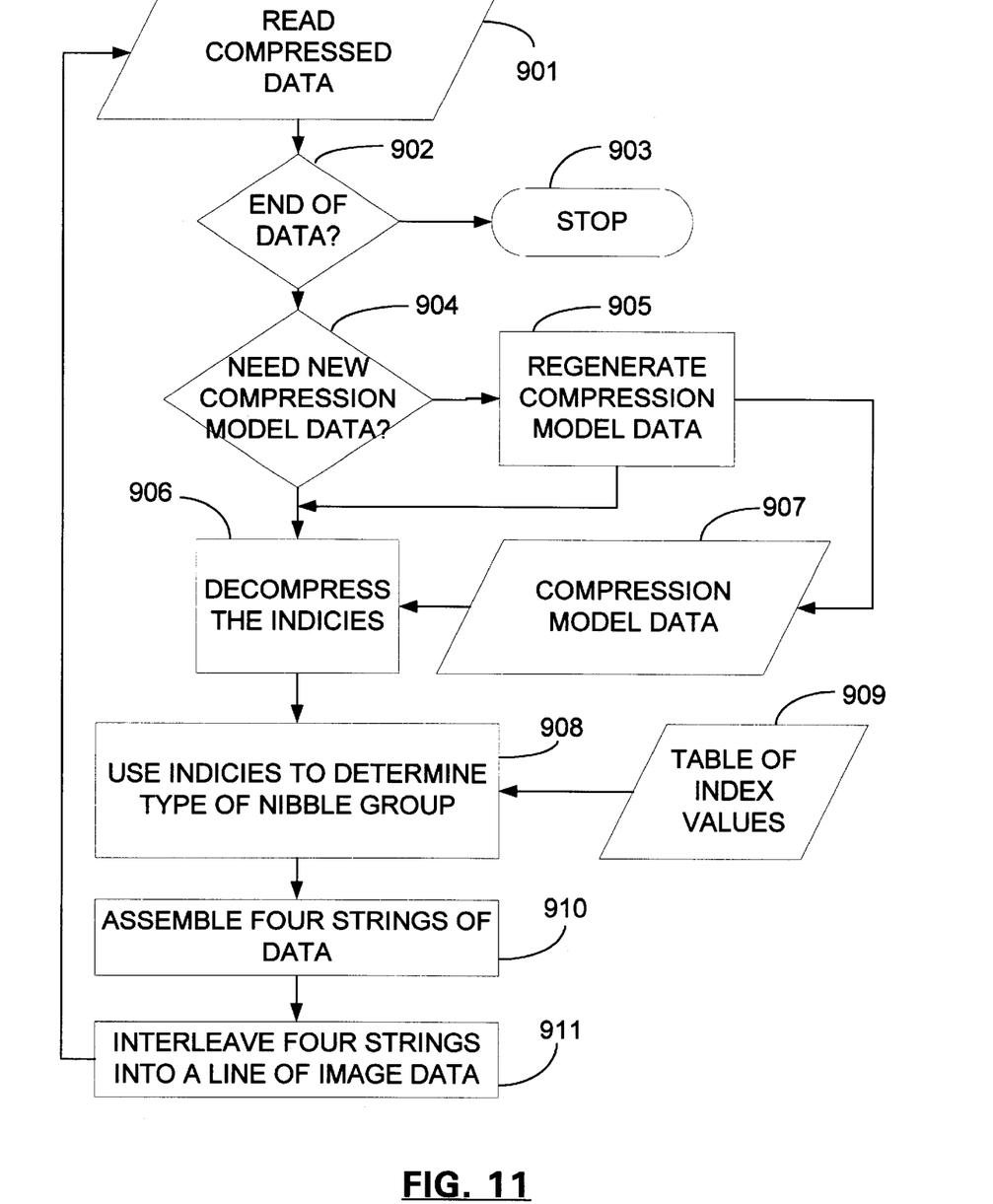
FIG. 11 is a flow diagram showing the complete decompression process.

Decompression is described in FIG. 11. First a line of compressed data is retrieved (901). If there was no more data, then the process is stopped (903). Based on the sync byte, the compression model data is regenerated (904 & 905). The compressed data is first decompressed (906) into the indices, using the present compression model data (907).

Next, the indexes are decoded (908), with the help of the index tables (909), into the nibble strings. These nibble strings are then interleaved to recreate the original bitmap data (911).

During the development of this present invention, several alternatives were considered for the location of base data to extract predicted row data. Some of the alternatives were to look back 4 rows and over 4 pixels, to look back 8 pixels within the current row, to look back 8 rows, and to look back 16 rows. Looking back 16 rows was a good choice for images that are scaled up by more than a ratio of 16:1 because every row was guaranteed to match a row either back 16 lines or ahead 16 lines. However, images that are scaled that much already compress fairly well. Images that are scaled by a factor greater than 8 may also be sent as source images due to I/O load balancing. Looking back 4 lines and over 4 pixels did not compress very well for some levels of gray and did not take advantage of compressing vertical edges. It was empirically determined that looking back 8 lines for the base line made the best choice for high resolution raster images. An alternative would be to use the scaling factor to determine the location of the base row of data for the compressor and decompressor. The base row would be 16 lines back for images that are scaled by a factor of 16 or more, and 8 lines back for all other images. This would make a good alternative for printers that are not capable of dithering raster images. For those products, all images are scaled and dithered by the driver, regardless of scaling factor.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for compressing raster images, the method comprising the steps of:

determining for each line of the raster image if the raster image represents text or halftoned image;

it the raster image represent text then sub pieces are sequential placed into one sub-string;

if the raster image represents the halftoned image, then interleaving sub-pieces into at least one sub-string;

indexing any predicted runs and literal runs in each sub-string into at least one index sub-string; and lossless compressing each index sub-string.

2. The method of claim 1 further comprising the steps of:

using a Huffman table;

waiting for an indication the that the Huffman table needs to be regenerated; and regenerating the Huffman table.

3. The method of claim 2 wherein the indication being the actual compression ratio compared to a threshold level.

4. The method of claim 1 wherein the step of lossless compression uses a Huffman encoding method.

5. The method of claim 1 wherein the step of lossless compression uses a Lempel-Ziv encoding method.

6. The method of claim 1 wherein the step of lossless compression uses a Arithmetic Compression encoding method.

7. A method of compressing images, the method comprising the steps of:

dithering the image to create a single bit per pixel raster data;

determining for each line of the raster image if the raster image represents text or halftoned image;

it the raster image represent text then sub pieces are sequential placed into one sub-string;

if the raster image represents the halftoned image, then interleaving sub-pieces into at least one sub-string;

encoding each sub-string into an index sub-string of a plurality of index sub-strings by indexing all predicted runs and literal runs; and lossless compressing the plurality of index sub-strings into compressed data.

8. The method as claimed in claim 7 further comprising the steps of:

decompressing the compressed data into the plurality of index sub-strings;

decoding the plurality of index sub-strings into the sub-strings by the predicted runs and the literal runs with data; and interleaving the sub strings to recreate the raster data.

9. The method of claim 8 wherein the step of lossless compression uses a Lempel-Ziv encoding method.

10. The method of claim 8 wherein the step of lossless compression uses a Arithmetic Compression encoding method.

11. The method of claim 7 wherein the step of lossless compression uses a Huffman encoding method.

* * * * *